May 19, 1970     G. H. HAERTLING ET AL     3,512,864

FERROELECTRIC CERAMIC OPTICAL RETARDATION DEVICES

Filed Sept. 14, 1967     2 Sheets-Sheet 1

Gene H. Haertling
Cecil E. Land
Ira D. McKinney

INVENTORS

BY

Gene H. Haertling
Cecil E. Land
Ira D. McKinney

INVENTORS

# United States Patent Office 3,512,864
Patented May 19, 1970

3,512,864
FERROELECTRIC CERAMIC OPTICAL RETARDATION DEVICES
Gene H. Haertling, Cecil E. Land, and Ira D. McKinney, Albuquerque, N. Mex., assignors to the United States of America as represented by the Atomic Energy Commission
Filed Sept. 14, 1967, Ser. No. 668,306
Int. Cl. G02f 3/00, 1/28
U.S. Cl. 350—150
16 Claims

ABSTRACT OF THE DISCLOSURE

A plane polarized light, optical retardation device or apparatus including a hot-pressed, optically uniaxial, birefringent, ferroelectric ceramic plate having a multiplicity of grains less than about 2 microns in size wherein the plate has an initial uniform polarization parallel to the major surfaces thereof and means for varying the retardation of plane polarized light passing through selected locations of the plate by incrementally varying the orientation of the optic axis of the ceramic at the surface of the plate or by varying the thickness of the plate.

Background of invention

The present invention relates to electro-optical systems which exhibit the property commonly referred to as optical retardation. By optical retardation is meant the conversion, in a birefringent optical device, of monochromatic plane polarized light into another polarization form, such as elliptical or circular polarization. A monochromatic plane polarized light beam incident on a birefringent device may be resolved into two orthogonal components in a plane normal to the direction of propagation, for instance a fast and slow component (i.e. for a negative birefringent device the extraordinary ray and the ordinary ray) corresponding to the smaller and larger refractive indices along the $c$ and $a$ crystalline axes in the optical device. As the orthogonal components of the incident plane polarized light pass through a birefringent optical device, the components propagate through the device at different velocities changing the phase relationship between the components. After the components have traversed the optical device, they are reunited to form a single elliptically (or circularly) polarized beam.

Prior systems have used the properties of birefringence in single ferroelectric crystals to vary the effective light transmitted through the crystal. In these systems, when a plane polarized light beam is directed towards one surface of a birefringent crystal which elliptical polarizes the transmitted light beam, an analyzer positioned with its axes at 90 degrees with respect to the incident polarized light beam may pass polarized light which includes a component on the analyzer axis which may then be sensed by a photosensitive device. Light transmittance in these prior systems may be varied by changing the birefringent properties of the ferroelectric crystals.

In some systems this is effected by heating a birefringent ferroelectric crystal slightly above its Curie temperature where it becomes paraelectric and optically isotropic. An electric field applied across the crystal enforces the ferroelectric phase and the crystal again becomes birefringent. The birefringence is proportional to the square of the electric field, hence the device exhibits the Kerr electro-optical effect. When the electric field is removed, the crystal again becomes optically isotropic. Such systems required precise temperature control and heating or cooling means in order to maintain the crystal in a narrow temperature range near its Curie temperature.

Other prior systems utilized ferroelectric single crystal plates having either the $c$ or $a$ crystallographic direction parallel to the major surfaces. Small localized areas of the plate were switched by 90° by an applied electric field of proper magnitude and direction, thereby varying the birefringence and retardation properties of the crystal. With the crystal positioned between cross polarizers, the change in birefringence may result in a corresponding change in transmittance of polarized light through the polarizer-crystal-analyzer combination. When the polarization potential was removed, the crystal relaxes back to its initial state in a relatively short time. The decay time of localized $a$-domains in a $c$-domain crystal may be of the order of a microsecond or less, while for $c$-domains in an $a$-domain crystal, the decay time may be of the order of minutes or hours since in single crystals, perpendicularly switched domains are opposed by high localized strain fields.

The width of the transition region or fringe between the locally switched area and the surrounding unswitched area in single crystals may be of the order of the crystal thickness. The fringe width and accordingly the crystal thickness may in many instances limit the number of localized switched areas which may be provided on a given crystal.

The prior optical retardation systems noted above generally provided only an on-off or binary "0" and "1" capability. There are many applications in modern technology for devices having more than two stable states such as in ternary and octonary storage devices, in analog memories, and in their associated logic circuits.

Summary of invention

In view of the limitations of the prior art as noted above, it is an object of this invention to provide a ferroelectric ceramic electro-optical retardation device having a plurality of different, stable retardation states.

It is a further object of this invention to provide a ferroelectric ceramic electro-optical retardation device wherein the fringe width surrounding a local retardation area is independent of and may be less than the thickness of the ceramic material.

It is a further object of this invention to provide a ferroelectric ceramic electro-optical retardation device which may be operated at room temperature.

It is a further object of this invention to provide a ferroelectric ceramic electro-optical retardation device which may be used to store or generate a high resolution image.

Various other objects and advantages will appear from the following description of one embodiment of the invention, and the most novel features will be particularly pointed out hereinafter in connection with the appended claims.

The invention comprises a hot-pressed, optically uniaxial, ferroelectric ceramic plate or member having a multiplicity of grains less than about 2 microns in size and an initial uniform ferroelectric polarization in a given direction, and means for varying the retardation of plane polarized light passing through selected locations of the ceramic plate.

Description of drawing

The present invention is disclosed in the accompanying drawings wherein:

FIG. 2 is a schematic diagram of a circuit which may be used to apply poling or switching voltage to the electrodes shown in FIG. 1a;

Detailed description

Figure 1A:
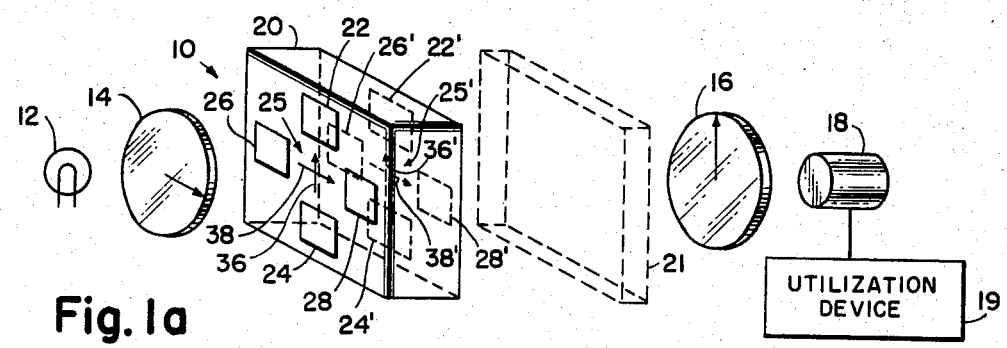
FIG. 1a is a diagrammatic view partially in perspective of an electro-optical retardation system including an optically uniaxial, birefringent, ferroelectric ceramic element with a particular electrode configuration.

An embodiment of the invention is shown in FIG. 1a in conjunction with a typical optical system. The system includes an electrically controlled optical retardation device 10, a conventional light source 12, such as an incandescent or mercury arc lamp which may also include a collimating lens or fiber optics system, a linear polarizer 14 and linear analyzer 16, each having a preferred transmission direction as indicated by the arrows, a suitable photosensitive device 18, such as a photomultiplier or photodiode, and a utilization device 19. The optical retardation device 10 effectively controls the intensity of light from source 12 which impinges upon the photosensitive device 18.

The optical retardation device 10 includes a hot-pressed, optically uniaxial, polycrystalline ferroelectric ceramic thin polished plate or member 20 having a multiplicity of grains with nominal grain diameters less than about 2 microns. Plate 20 is shown for purpose of illustration in FIG. 1a with an exaggerated thickness. Hot-pressed, ferroelectric ceramic plates have exhibited the desired light transmission and retardation properties of this invention with different thicknesses in the range of 20 to 250 microns. In a hot-pressed, ferroelectric ceramic plate, each grain or crystallite of the polycrystalline ceramic may include one or more ferroelectric domains. Each domain may be viewed as an assembly of parallel aligned electric dipoles existing as a result of the noncentrosymmetric configuration of the atoms in a unit cell of the crystal lattice. The parallel aligned assembly of electric dipoles forming a domain have a resultant electric dipole arising from the vectorial addition of the unit cell elementary dipoles within the domain. When an external electric field is applied to the ferroelectric ceramic plate, the resultant domain dipoles tend to align themselves in a parallel array in the direction of the applied field. It has been found that when the electric field is removed, most of the resultant domain dipoles in a hot pressed, ferroelectric ceramic plate remain in their newly acquired orientations which are essentially parallel to the electric field direction. The ceramic is then said to be partially or fully poled in the direction of the previously applied field. In general, the physical properties of the poled ceramic are anisotropic with infinite rotational symmetry in the plane normal to the direction of the previously applied poling field.

An optically uniaxial ferroelectric ceramic is one in which the individual grains or crystalltes are optically uniaxial, i.e., they exhibit the symmetry properties of an optically uniaxial, birefringent crystal. Optically uniaxial crystallites include those with tetragonal, trigonal (rhombohedral), and hexagonal symmetries. When an extremely homogeneous, optically uniaxial ferroelectric ceramic with uniform nominal grain diameters less than two microns is electrically poled, it becomes optically birefringent in the plane parallel to the poling direction. If the individual crystallites exhibit negative birefringence, the electrical polar direction will be the fast axis of the ceramic; if the crystallites exhibit positive birefringence, the electrical polar direction becomes the slow axis of the ceramic. The value of the birefringence in a ferroelectric ceramic plate depends upon the degree or magnitude of electrical poling in a given direction, i.e., whether the ceramic is fully or only partially poled in a particular direction. The orientation of the optic axis depends upon the direction of electrical poling in the ceramic. Electrical control of the light transmission properties of the retardation device 10 is, therefore, effected by varying the magnitude or direction, or both, of its ferroelectric polarization by the appliction of an external electric field. This, in effect, varies the birefringence or the angle $\rho$ of FIG. 1b, or both, associated with the retardation device 10. The light transmission properties of plate 20 may be varied by a first pair of electrodes 22 and 24 and a second pair of electrodes 26 and 28 perpendicularly disposed with respect to the first pair, with each pair oppositely disposed across and separated by a single localized polarization area 25 at a single surface of the plate as shown.

Figure 2:
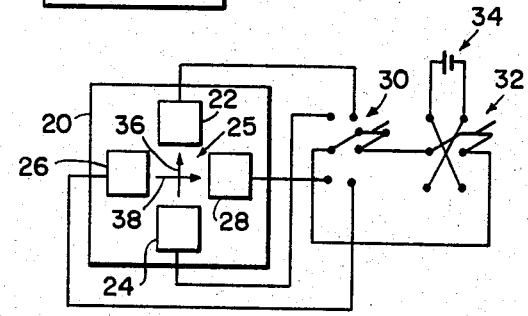

The set of electrodes, including electrode pairs 22 and 24 and 26 and 28 may be energized by any conventional electrical means to generate electric poling or switching fields separately between each electrode pair and parallel to the plane of the surface at which the electrodes are disposed. A suitable electrical means may be that shown in FIG. 2. The respective electrode pairs may be connected through a double pole, double throw switch 30 and a polarity reversing switch 32 to a conventional direct current power source such as battery 34. Any suitable electrical or electronic switching or logic circuit may be used to provide the desired poling or switching fields across the electrode pairs as will be apparent to those skilled in the art. With electrode 22 biased more positive than electrode 24 and electrodes 26 and 28 electrically neutral, localized area 25 of ceramic plate 20 may be poled or switched to align its optic axis in the direction of arrow 36. With electrode 28 biased more positive than electrode 26 and electrodes 22 and 24 electrically neutral, area 25 may be poled or switched to align its optic axis in the direction of arrow 38. By reversing the bias on the respective electrodes, the electrical polar directions may be reversed for each electrode pair, i.e., switched by 180 degrees. Thus, for the set of electrodes shown, area 25 may be polarized in four distinct directions.

It has been found that a ceramic plate, having the characteristics noted above and which has been made by the process described below, may be electrically poled parallel to the surface of the plate, hence, with its optic axis in one of the directions indicated by arrows 36 or 38 in area 25. It has further been found that the ceramic plate may be similarly electrically poled at each surface of the plate independently without affecting the electrical polar condition at the opposite surface of the plate providing the dimension of the poled area in the direction of the poling field does not exceed the thickness of the plate. Moreover, this electrical poling at the surfaces of the ceramic plate effected in the manner described above is stable with time and will remain until changed by the subsequent application of a switching field in another direction. Thus, a second set of electrodes 22', 24', 26', and 28' may be disposed at the surface of plate 20 opposite electrodes 22, 24, 26 and 28. Eelectrodes 22', 24', 26' and 28' may be connected to a suitable electrical energizing means such as the circuit shown in FIG. 2 so as to align the optic axes of the grains at the surface at a localized area 25' in any of four directions as noted above, such as in the direction of arrows 36' and 38'. With the two sets of electrodes shown in FIG. 1, there may be sixteen different and distinct combinations of electrical polar conditions for plate 20 along a line passing through the two localized areas 25 and 25'. It should be noted that for maximum control of light transmission, the collimated, plane polarized light beam from light source 12 and polarizer 14 should be directed to pass through the centers of both areas 25 and 25'.

Figure 1B:
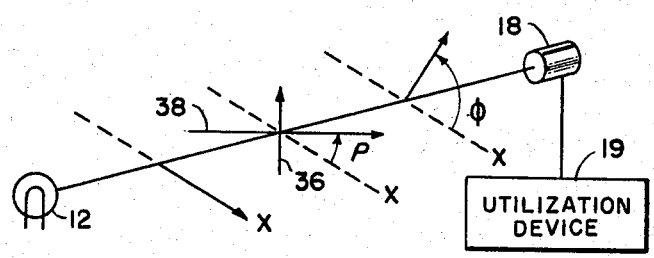
FIG. 1b is a schematic representation of the system of FIG. 1a showing the relative orientations of the preferred transmission directions of the polarizer and analyzer and the optic axes of one surface of the ferroelectric ceramic element.

Plane polarized light normally incident on the ceramic plate 20 will be affected differently depending on the angle $\rho$, shown in FIG. 1b. between its plane of polarization and the privileged directions (fast and slow axes) of the ceramic plate 20. If the incident light is plane polarized parallel to one of the privileged directions, the ceramic plate 20 transmits only one ray; this single ray vibrates parallel to this particular privileged direction only. If the incident light is plane polarized parallel to neither privileged directions of the ceramic plate 20, it is resolved vectorially into two orthogonal rays or components upon entering the ceramic plate 20, and each of these rays or components vibrate parallel to a privileged direction. One of these orthogonal components (the slow component), is retarded in phase with respect to the other (the fast component) as they travel through the ceramic plate 20. Upon emergence, the two orthogonal components will, in general, have different phases and they will recombine to form a single ray of elliptically polarized light. If upon recombination the phase difference between the fast and slow components corresponds to zero or an even number of half-wavelengths, the ellipse degenerates into a line parallel to the incident plane of vibration; hence, the emerging ray is plane polarized parallel to the polarization direction of the incident ray. If upon recombination the phase difference between the two components is an odd number of half-wavelengths the ellipse again degenerates into a line, but, in this case, it makes an angle $2\rho$ with the plane of vibration of the incident light. If the retardation corresponds to an odd number of quarter-wavelengths, and the angle $\rho$ is 45°, the emergent light will be circularly polarized. If the light transmitted by the retardation device 10 and incident upon the analyzer 16 includes a component in the preferred transmission direction of the analyzer, that component only is transmitted to the photosensitive device 18. Neglecting reflection, absorption, and scattering losses, the specular transmittance T of the combination of the polarizer 14, retardation device 10, and analyzer 16, as shown in FIGS. 1a and 1b, is given by:

$$T = I/I_0 = \cos^2 \phi - \sin^2 2(\rho - \phi) \cdot \sin 2\rho \cdot \sin^2 (\Delta)\pi \quad (1)$$

where:

$I_0$ = intensity of incident light on polarizer 14,
$I$ = intensity of light emerging from analyzer 16,
$\phi$ = angle between the polarizer 14 preferred transmission direction and that of the analyzer 16,
$\rho$ = angle between the polarizer 14 preferred transmission direction and the nearest optic axis orientation of the retardation device 10,
$\Delta$ = retardation in wavelengths = $(n_e - n_o)(t/\lambda_o)$,
$n_e$ = refractive index along the optic axis,
$n_o$ = refractive index in any direction in the plane normal to the optical axis,
$t$ = thickness of plate, and
$\lambda_o$ = the wavelength of light from source 12.

Given some particular value of retardation $\Delta$, depending upon the birefringence $(n_e - n_o)$, the plate thickness $t$, and the light wavelength $\lambda_o$, it is apparent that the light intensity I incident on the photosensitive device 18 may vary through one or more maxima and minima as the angle $\rho$ is varied from 0° through 360°. It has been found, however, that the light incident upon the photosensitive device 18 consists of two components: (1) the component with intensity I described above, and (2) a component with intensity $I_S$ due to incoherent scattering in the ceramic plate 20. The resulting intensity $I_R$ of the light incident on the photosensitive device 18 is, then, the scaler sum of the intensities I and $I_S$:

$$I_R = I + I_S \quad (2)$$

Further, it has been discovered that $I_R$ may be different and distinct for the four possible optic axis orientations in area 25, the four optic axis orientations in area 25', and all possible combinations of the optic axis orientations in both areas 25 and 25'. Thus for each of the sixteen possible combinations of optic axis orientations in areas 25 and 25', photosensitive device 18 may sense a different level of light intensity $I_R$ emerging from analyzer 16. The photosensitive device 18 transmits an appropriate signal, proportional to the intensity of light emerging from analyzer 16, to the utilization device 19.

As previously stated, the light transmission characteristics of thin polished plates of certain hot-pressed, fine-grained (i.e., with nominal grain diameters less than two microns), ferroelectric ceramics depend upon the ferroelectric polarization state. The degree and direction of domain alignment, i.e., the magnitude and direction of electrical poling, determines the optical transfer characteristics of these ceramic plates. The previous description of the retardation device 10 details the effects on light transmission when the ceramic plate is electrically poled in the plane parallel to its major surfaces. When the ceramic material is in a random or thermally depoled state, its light transmittance is principally a function of plate thickness. The appearance of a ceramic plate varies from opaque to nearly transparent depending on its thickness. Transmitted plane polarized light is 10 to 60 percent depolarized, depending on plate thickness, due to scattering by the randomly oriented ferroelectric domains. The diffuse light transmission is approximately equal to that in any of the electrically poled states.

When the ferroelectric ceramic plate is electrically poled normal to its major surfaces it becomes isotropic to light normally incident on its major surfaces. This behavior is to be expected since the optic axis of the ceramic plate coincides with its electrical polar direction. Normally incident plane polarized light is, therefore, transmitted with both polarization form and direction preserved. Although some light scattering occurs, approximately 95 percent of the transmitted light remains plane polarized in a direction parallel to the polarization plane of the incident light. The ceramic plate appears transparent compared to the random state. The light which is scattered is nearly uniformly distributed on the basis of intensity over a wide solid angle. Scattering losses may account for nearly all the attenuation exhibited by the ceramic plate.

If the ceramic plate is heated to a temperature above its Curie temperature the individual grains or crystallites become isotropic, hence the thin plate becomes completely isotropic. Scattering is substantially reduced so that the plate becomes quite transparent. Since it is isotropic in all directions, plane polarized light is transmitted with essentially all of the polarization preserved and no rotation of the polarization plane.

Still greater numbers of distinct output light levels may be obtained by positioning further ceramic plates with similar electrode configurations in line with plate 20 (such as is illustrated in FIG. 1 by a second plate 21 shown with dotted lines) or by increasing the number of different optic axis orientations possible on each surface of the plate. Plate 21 may include either one or two sets of electrodes similar to the electrodes on plate 20. With two sets of electrodes, photosensitive device 18 may sense a greater number of distinct light levels.

Figure 3:
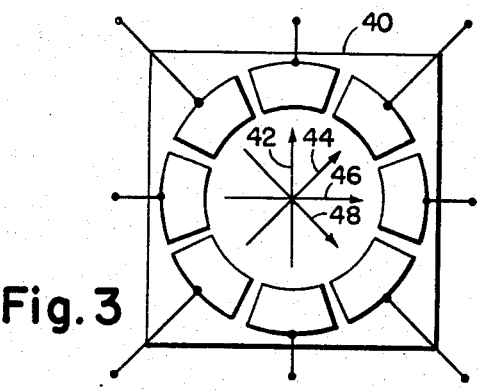
FIG. 3 is an elevation view of a further embodiment of an optically uniaxial, ferroelectric ceramic element and electrode configuration which may be used in the system of FIG. 1.

Referring to FIG. 3, the number of different optic axis orientations may be doubled by adding further sets of diagonally opposing electrode pairs. By applying the proper electrical bias to a particular pair of electrodes, the ceramic optic axis may be polarized or oriented in a ferroelectric ceramic plate 40 in any of directions 42, 44, 46 or 48 or the reverse thereof, where for example, the directions may be at angles of 90°, 45°, 0° and −45° respectively with the plane of polarization of the incident beam of light such as from polarizer 14 in FIG. 1. A second set of electrodes may be positioned at the reverse surface of plate 40 in the same manner as shown in FIG. 1 to still further increase the number of distinct levels of light intensity passed by a suitably oriented analyzer.

The light transmission characteristics of the ceramic plate, such as either plate 20 or plate 40 in FIGS. 1 and 3 respectively, may be completely described using the Stokes-Mueller formalism by;

$$\{I, Q, U, V\} = [M]\{I_o, Q_o, U_o, V_o\} \quad (3)$$

where:
I = intensity irrespective of polarization,
Q = intensity with horizontal linear polarization preference,
U = intensity with +45° linear polarization preference, and
V = intensity with right circular polarization preference.

The components of the Stokes vector for the incident and transmitted beams may be $I_o$, $Q_o$, $U_o$, $V_o$ and I, Q, U, V, respectively, and [M], the optical transfer function, may be described completely by the 4 x 4 Mueller matrix.

$$[M] = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix}$$

The factors $m_{ij}$ of Equation 4 may be measured by placing quarter wave plates between plate 20 and polarizer 14 and between plate 20 and analyber 16 of FIG. 1 and measurements made with photosensitive device 18 in a well known manner for various orientations of the quarter wave plates, polarizer, analyzer and ceramic optic axes. The factors may also be calculated by well known mathematical matrix principles for the various optic axis orientations in the ceramic plate.

Ceramic plates 20 and 40 may be any hot-pressed, optically unaxial, ferroelectric ceramic, such as barium titanate or lead zirconate-lead titanate, having a grain size less than about 2 microns and a high degree of homogeneity. A typical ferroelectric ceramic may be the lead zirconate-lead titanate solid solution having a ratio of about 65 mol percent $PbZrO_3$ and 35 mol percent $PbTiO_3$ and containing about 2 atom percent Bi as $Bi_2O_3$. The lead zirconate-lead titanate solid solution may be prepared in the following manner: (1) weighing the chemical oxide powders, (2) wet mixing in a suitable liquid medium, (3) drying, (4) calcining at a temperature of about 800° C. for about 1 hour, (5) granulation or wet milling of the calcine to break down the partially sintered particle aggregates, (6) drying, (7) cold pressing of the powder into a slug and then (8) hot pressing at a temperature from about 800° C. to about 1050° C. for from about 1 to 24 hours at a pressure from about 500 to about 20,000 p.s.i. The grain size may be controlled by the proper choice of chemical modifiers which enhance the desirable electrical properties yet inhibit grain growth (such as $Bi_2O_3$ or $Nb_2O_5$), by the selection of raw material oxide powders which are of sufficient chemical purity (generally greater than about 99.2%) and by the proper selection of the hot pressing conditions of temperature, time and pressure. After hot pressing, the slug may be sliced into thin wafers which may then be annealed at about 500 to 700° C. for about 15 minutes, cooled to room temperature, electrodes positioned or plated on, and the plate electrically polarized to the desired uniform initial polarization. The material exhibits the desired electro-optical properties at room temperature.

The width of the fringe (i.e. the width of the transition region between a locally switched area and the surrounding unswitched area) in the ceramic plate may be a function of grain size, generally between five and ten nominal grain diameters. Hence, for 1 micron grain diameter ceramic, the fringe width may be between 5 and 10 microns. Since the fringe width may be dependent on grain size, a desired fringe width may be achieved by selecting the appropriate hot pressing parameters. For instance, in order to produce a grain size of about 1 micron, the hot press slug may be hot pressed at a temperature of about 1000–1050° C. for about 4 hours at about 8000 p.s.i.

In a hot pressed, ferroelectric ceramic plate having an initial ferroelectric polarization, grains switched by a localized field may be opposed by strain fields which are small compared to those in a single crystal. Therefore, the switched area may not tend to relax back into the original polar state, but remains indefinitely until an appropriate switching field may be applied to change the orientation.

The optical retardation devices shown in FIGS. 1 and 3 may be used as light shutters (with an on-off "0"– "1" capability) in the system shown in FIG. 1. With an electrode configuration or set of electrodes as shown in FIG. 3 on one surface of the ceramic plate and with the polarizer and analyzer aligned at 90° ($\phi = 90°$), the light shutter may be in a closed condition with ceramic optic axis parallel with either directions 42 or 46. An electric field may then be applied to the proper electrode to switch the ceramic optic axis into either the 44 or 48 direction so as to open the light shutter and vice versa. Maximum light transmission will occur if the retardation $\Delta$ is equal to an integral number of light wavelengths.

With the optical retardation device 10 shown in FIG. 1, a two-surface light shutter may be used. With the ceramic optic axes aligned at both surfaces in areas 25 and 25' in either direction 36 or 38, the shutter may be closed. With the ceramic optic axis at one surface switched perpendicular to the ceramic optic axis at the other surface, the shutter may be open. Switching perpendicularly either area 25 or 25' may again close the shutter. With this electrode configuration and mode of operation, optical retardation device 10 may function as an optical logic circuit such as a logic OR or AND circuit.

Figure 4:
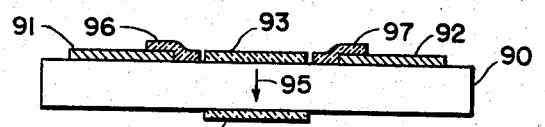
FIG. 4 is a cross-sectional view of a further embodiment of an optically uniaxial ferroelectric ceramic element and electrode configuration which may be used in the system of FIG. 1.

If a ceramic plate electrically poled normal to its major surfaces is provided with electrodes for locally switching from this polar state to one in which the electrical polar vector is parallel to the major surfaces, a second type of light shutter may be achieved. FIG. 4 shows a ceramic plate 90 with an electrode configuration capable of performing this type of shutter action. With normally incident plane polarized light, and with the analyzer (16 as shown in FIG. 1) preferred transmission direction orthogonal to the plane of polarization of the incident light ($\phi = 90°$), the light shutter is normally closed. If the retardation $\Delta$ is designed to be an integral number of wavelengths by adjusting the plate thickness $t$ and light wavelength $\lambda_o$, and the electrodes displaced on the surface such that $\rho = 45°$ after switching, the light shutter may be opened by applying a switching voltage across electrodes 91 and 92 similar to electrode pair 22 and 24 in FIG. 1a. To close the light shutter, a switching voltage may be applied between suitable transparent electrodes 93 and 94 to return the plate to electrical polarization normal to its major surfaces as shown by arrow 95. Electrodes 91 and 92 may be electrically insulated from electrodes 93 and 94 by suitable insulation such as insulators 96 and 97.

Figure 5:
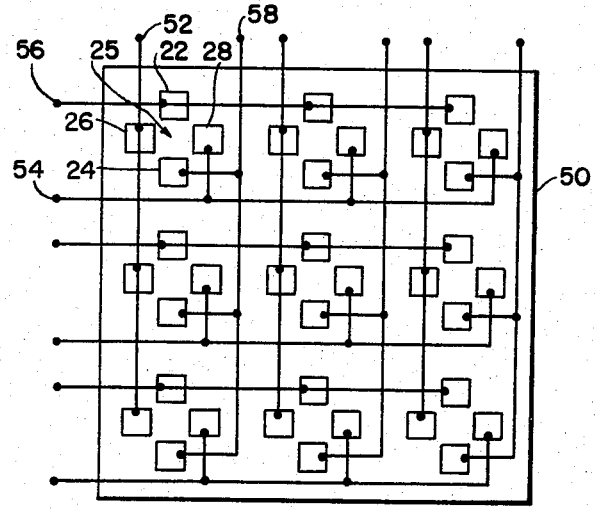
FIG. 5 is an elevation view of the electrode configuration shown in FIG. 1 arranged in a matrix array on a ceramic element.

The electrode configurations shown in FIGS. 1, 3 or 4, or any other suitable set of electrodes may be deposited or photographically etched on a large ceramic plate 50 along with suitable connecting electrodes in a matrix array such as shown in FIG. 5. Thus, each localized polarization area, such as area 25 between electrodes 22, 24, 26 and 28, may be addressed in a well known manner by applying an electric field to a particular pair of address lines. For bit location or area 25, the address lines may be 52 and 54 and 56 and 58. The matrix array shown in FIG. 5 may be used as a memory array or an optical display with a very narrow line width determined by grain size. Using similar electrode configurations on both surfaces or the electrode configuration shown in FIG. 3, the matrix array may be used as either an x–y or x–y–z addressed memory matrices with 2, 4, 8, 16 or more stable states per bit location. This latter feature provides both a digital (for a wide ranged of number systems) and analog storage capability.

The light intensity of the component of polarized light in the preferred transmission direction of analyzer 16 in FIG. 1 may also be varied by varying the thickness, $t$, of the ceramic plate. Thickness may also affect light intensity as shown by Formula 1 above by varying retardation as well as changing the amount of scattering by the plate. With a ceramic plate, such as plate 60 in FIG. 6, having all the ceramic optic axes aligned in a given direction (preferably normal to the direction of propagation of incident light to provide maximum birefringence and in some direction not parallel with either of the preferred transmission directions of the polarizer 14 or analyzer 16 of FIG. 1 which will give maximum extinction for a particular value of retardation $\Delta$), a change in thickness at any point or location on the plate may effect a localized change in retardation and a localized change in light intensity through the analyzer. The change in light intensity may be sensed by photosensitive device 18 or a plurality of such devices arranged in any desired matrix pattern or by the naked eye.

Figure 7:
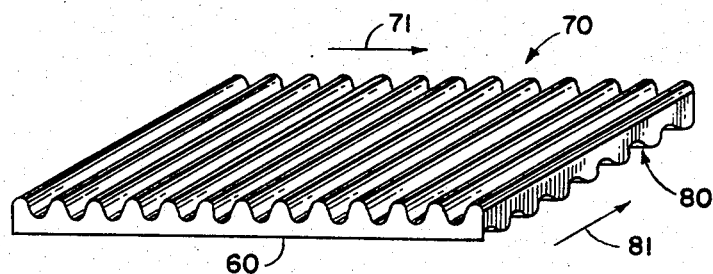
FIG. 7 is a perspective view showing the operation of the ceramic element illustrated in FIG. 6.

The thickness of plate 60 may be varied by generating either standing or traveling surface waves by any suitable means such as by signal generator 62 and input comb-type electrodes 64 and output comb-type electrodes 66 and output termination or load 68. Surface waves, such as traveling waves 70 in FIG. 7, may be generated traveling in the direction of arrow 71. As wave 70 moves along the surface of plate 60, the thickness of the plate at a given point or location may increase and decrease in the same manner as the signal generated by generator 62, such as sinusoidally. Electrodes 64 and 66 may be deposited on the surface of plate 60 by conventional plating or deposition techniques.

Further, thickness variation of plate 60 may be produced simultaneously by generating a second traveling surface wave on the opposite surface of the plate by any suitable means such as by signal generator 72 and input electrodes (not shown) and output electrodes (not shown) and output termination or load 78. The input and output electrodes for the second traveling wave may be the same or similar to electrodes 64 and 66, however, oriented so as to generate a surface wave 80 traveling generally at right angles to wave 70 in the direction 81. The simultaneous traveling surface waves 71 and 81 may thus effectively provide both a vertical and a horizontal scan of the ceramic plate. By varying the phases of the signals generated by generators 62 and 72 by a suitable means, such as phase modulator 82, a pattern or display may be generated in the plate and viewed through analyzer 16. Since the line width generated in plate 60 may be dependent only on the frequency of generators 62 and 72 and the angular dispersion of the surface wave, line widths may be obtained as low as about five microns. With the resulting resolution, the display or pattern may be projected to substantially larger sizes limited primarily by the intensity of the light source. A ceramic plate having dimensions of about one by one inch may be projected with a magnification of 100 with good resolution.

Figure 6:
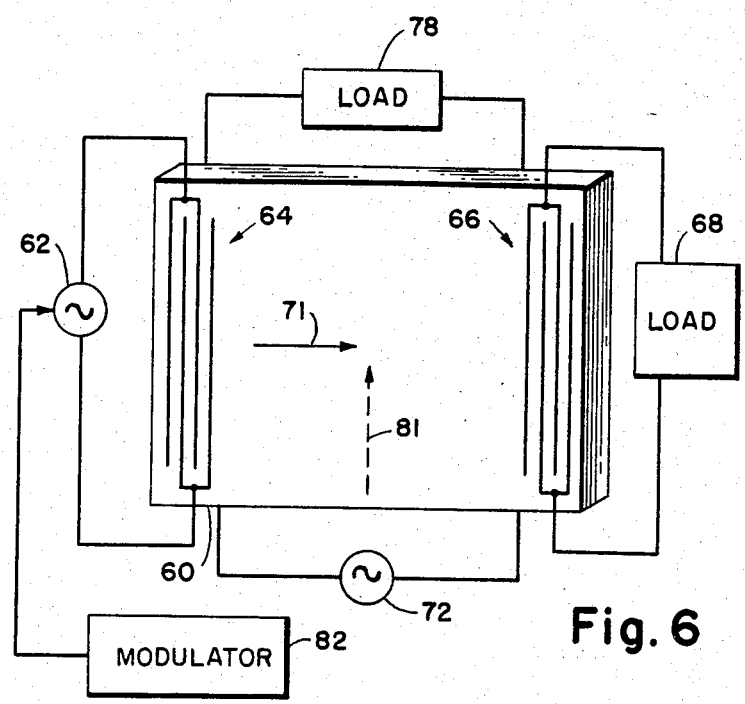
FIG. 6 is a diagrammatic view, partially in perspective, of a further embodiment of an optically uniaxial, ferroelectric ceramic element and electrode configuration which may be used in the system of FIG. 1.

The optical retardation device shown in FIGS. 5 and 6 coupled with a system similar to FIG. 1 may be used for various types of video display and imaging systems, including computer readouts and conventional television picture reception. An array or group of comb-type electrodes may be substituted for electrodes 64 and 66 and aligned to generate different traveling surface waves along the plate surfaces which waves may then be varied in phase relationship by suitable electrical means to attain further control of the image or display.

It will be understood that various changes in the details, materials and arrangements of the parts, which have been herein described and illustrated in order to explain the nature of the invention, may be made by those skilled in the art.

What is claimed is:

1. A plane polarized light, optical retardation device comprising: a fine grained, hot-pressed, optically uniaxial and birefringent, ferroelectric ceramic plate having a multiplicity of domains and grains and an initial uniform optic axis orientation and of thickness to be optically transparent; and means for varying by different amounts the retardation of plane polarized light passing through selected locations of said plate.

2. The device of claim 1 wherein said ferroelectric ceramic grains are less than about 2 microns in size.

3. The device of claim 2 wherein said ferroelectric ceramic is a solid solution of lead zirconate and lead titanate in which the lead zirconate is present in the proportion of 65 mol percent and the lead titanate is in the proportion of 35 mol percent, said composition also including about 2 atom percent bismuth oxide.

4. The device of claim 1 wherein said ferroelectric ceramic is hot pressed at a temperature from about 800° C. to about 1050° C. for from about 1 to 24 hours at a pressure from about 500 to about 20,000 p.s.i.

5. The device of claim 1 wherein said retardation varying means includes a pair of electrodes disposed at a surface of said plate on opposite sides of one of said locations and means for applying an electric field across said electrodes.

6. The device of claim 5 wherein said retardation varying means includes a plurality of electrode pairs disposed at a surface of said plate at different positions across said location.

7. The device of claim 6 having said plurality of electrodes disposed at a surface of said plate at each of a plurality of locations of said plate.

8. The device of claim 5 wherein said retardation varying means includes a second pair of electrodes disposed at the opposite surface of said plate on opposite sides of said location and means for applying an electric field across said second electrode pair.

9. The device of claim 8 wherein said retardation varying means includes a plurality of electrode pairs disposed at different positions across said location at said opposite surface.

10. The device of claim 5 wherein said retardation varying means includes a second pair of electrodes disposed at opposite surfaces of said plate over said location said electrodes being optically transparent.

11. The device of claim 1 wherein said retardation varying means includes means for generating surface waves traveling in a first direction on a surface of said plate.

12. The device of claim 11 wherein said retardation varying means includes means for generating surface waves traveling in a second direction on the opposite surface of said plate.

13. The device of claim 12 including means for varying the phase relationship of said surface waves.

14. The device of claim 1 including means adjacent said plate for passing plane polarized light through said plate at said locations.

15. The device of claim 14 including means for passing light transmitted through said plate at said locations having a plane of polarization at an angle to the incident plane polarized light.

16. An electro-optical system comprising: a plurality of optical retardation devices as claimed in claim 1 located adjacent to one another in optical sequence; means adjacent one of said devices for passing plane polarized light simultaneously through each of said plates at a selected location of each plate; and means adjacent another of said devices for passing light transmitted through said plates at said locations having a plane of polarization at an angle to the incident plane polarized light.

References Cited

UNITED STATES PATENTS

| | | | |
|---|---|---|---|
| 2,600,962 | 6/1952 | Billings | 350—149 |
| 2,928,075 | 3/1960 | Anderson | 350—150 |
| 3,027,806 | 4/1962 | Koelsch et al. | 350—150 |
| 3,083,262 | 3/1963 | Hanlet | 350—150 X |
| 3,167,607 | 1/1965 | Marks et al. | 350—150 |
| 3,423,686 | 1/1969 | Ballman et al. | 350—150 |

DAVID SCHONBERG, Primary Examiner

P. R. MILLER, Assistant Examiner

U.S. Cl. X.R.

264—1; 340—173.2; 350—147, 160